US009772344B1

(12) United States Patent
Greer

(10) Patent No.: US 9,772,344 B1
(45) Date of Patent: Sep. 26, 2017

(54) PULSE GENERATOR

(71) Applicant: The United States of America as represented by the Administrator of the National Aeronautics and Space Administration, Washington, DC (US)

(72) Inventor: Lawrence Greer, Avon, OH (US)

(73) Assignee: The United States of America as Represented by the Administrator of National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 13/771,920

(22) Filed: Feb. 20, 2013

(51) Int. Cl.
    *G11B 19/28*     (2006.01)
    *G01P 3/49*     (2006.01)

(52) U.S. Cl.
    CPC ...................... *G01P 3/49* (2013.01)

(58) Field of Classification Search
    CPC .. G01D 5/24452; G01D 5/2451; G01D 5/145; G01B 7/30
    USPC ....................... 324/38, 309, 12, 11
    See application file for complete search history.

(56) References Cited

U.S. PATENT DOCUMENTS

| 4,088,874 | A | * | 5/1978 | Hartig | 377/47 |
|---|---|---|---|---|---|
| 4,115,684 | A | * | 9/1978 | Lindbom | 219/124.22 |
| 4,794,551 | A | * | 12/1988 | Yoshida | 702/145 |
| 4,870,665 | A | * | 9/1989 | Vaughn | 327/114 |
| 5,551,017 | A | * | 8/1996 | Baxter | 713/401 |
| 6,460,422 | B1 | * | 10/2002 | Kuroda | G01L 3/12 73/862.324 |
| 7,104,133 | B2 | * | 9/2006 | Kuroda | G01L 3/12 356/455 |
| 2002/0105323 | A1 | * | 8/2002 | Sakai et al. | 324/237 |
| 2005/0231191 | A1 | * | 10/2005 | Tsuji | 324/164 |
| 2005/0258789 | A1 | * | 11/2005 | Getz | H02P 6/08 318/400.02 |

* cited by examiner

*Primary Examiner* — Alesa Allgood
(74) *Attorney, Agent, or Firm* — Robert H. Earp, III

(57) ABSTRACT

An apparatus and a computer-implemented method for generating pulses synchronized to a rising edge of a tachometer signal from rotating machinery are disclosed. For example, in one embodiment, a pulse state machine may be configured to generate a plurality of pulses, and a period state machine may be configured to determine a period for each of the plurality of pulses.

20 Claims, 4 Drawing Sheets

PULSE GENERATOR

ORIGIN OF THE INVENTION

The invention described herein was made by an employee of the United States Government and may be manufactured and used by or for the Government for Government purposes without the payment of any royalties thereon or therefore.

FIELD

The present invention relates to a pulse generator and, more particularly, to a pulse generator for rotating machinery.

BACKGROUND

There are several experimental setups involving rotating machinery that require some form of synchronization. Furthermore, many of these setups require continuous tracking of the revolution period to yield an accurate pulse(s)-per-revolution signal generator. As an example, optical experiments that use luminescent coatings on rotating equipment require a phase delay generator (PDG) to control data acquisition. This PDG generally uses a once-per-revolution input signal and computes the time delay necessary to advance the rotor to a user selectable fraction of a revolution in degrees. A continuously updated calculation of delay time is performed using the period from the current revolution while the actual delayed output is executed on the following revolution. Ultimately, control of the rotational timing allows the acquisition of rotor data in the same relative location regardless of speed. This is critical to the acquisition of radiometric luminescent coating data which relies on normalizing the data at the same rotational location.

Acquiring data using the same image view while maintaining the same number of integrated illumination pulses produces an image pair of the luminescent coating with intensity differences corresponding to changes in pressure or temperature. Therefore, an integrated pulse count, which allows an exact number of integrated flash illuminated rotations, is also an essential feature for a PDG. Sometimes, the output pulse width factors into the integration time, and the output pulse width must be controlled to meet test requirements.

Furthermore, possessing two channels with separate once-per-revolution input signals may allow the rotational control of two independent rotors. A PDG with this kind of independent control would enable rotor interactions to be captured with standard commercial off-the-shelf (COTS) imaging devices.

Other experimental setups such as a particle image velocimetry (PIV) system use a pulsed laser that must be synchronized to the rotating blades of a turbine. When acquiring PIV data from rotating machinery, a typical setup also uses a once-per-revolution signal from the rig as a trigger. Afterward, a delay generator is used to phase step the actual laser pulse to the blade passage of interest in the machine. The phase delay can be a significant fraction of the rig single rotation time, but the assumption in this configuration is that the rig is running at constant speed and the phase delay will always locate the blade of interest at the exact position in the field of view in the PIV system. However, if the rotation speed changes, the fixed phase delay is no longer accurate. Using a PDG that tracks the revolution period keeps the PIV system tuned to the true rotational speed of the rig, as in the case of the luminescent coating rig mentioned earlier. The constant correction for rotational speed yields a repeatable blade location for acquiring the PIV image data. A fixed phase delay is not required as in older PIV systems, since the user can specify a circumferential rotational angle and the PDG computes the correct delay to position the desired blade at the desired circumferential position.

However, there are PIV applications where a once-per-revolution signal is provided, but a once-per-blade signal is required. For example, one particular PIV system configuration uses a pulsed laser and a camera with an electromechanical shutter to acquire data. This system possesses a shutter that requires 24 ms to open and then close and a laser that must be triggered every 100 ms in order to remain at thermal equilibrium. For a 6000 rpm machine with 12 blades, the once-per-revolution time is 10 ms. Using the once-per-revolution signal in tandem with a 100 ms delay circuit that ignores input signals during its delay cycle would fire the laser anywhere from 100 ms to 110 ms, which is not sufficient to keep the laser running at a stable 10 Hz. Accordingly, an improved pulse generator that can generate once-per-blade signals would reduce the laser firing range to 100 ms to 100.8 ms for the 12 blade case which may be beneficial for timing stability.

SUMMARY

Certain embodiments of the present invention may provide solutions to the problems and needs in the art that have not yet been fully identified, appreciated, or solved by current pulse generators. For example, some embodiments of the present invention pertain to a pulse generator configured to generate pulses synchronized to the rising edge of a tachometer signal from any piece of rotating machinery. The synchronized pulses can vary by the delay angle, pulse width, number of pulses per period, number of skipped pulses, and total number of pulses.

In one embodiment, an apparatus is provided. The apparatus includes a pulse state machine configured to generate a plurality of pulses, and a period state machine configured to determine a period for each of the plurality of pulses.

In another embodiment, a computer-implemented method is provided. The computer-implemented method includes generating, at a pulse state machine, a plurality of pulses for a rotating object, and determining, by a period state machine, a period for each of the plurality of pulses for the rotating object.

In yet another embodiment, an apparatus is provided. The apparatus includes a microcontroller. The microcontroller is configured to transmit an off-time counter and an on-time counter to a pulse state machine. The off-time counter is used to determine when to generate a pulse for a rotating object, and the on-time counter is used to determine when to turn off the pulse for the rotating object.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

The pulse generator of some embodiments is a flexible instrument that allows a user to generate pulses synchronized to a rising edge of a tachometer signal from any piece of rotating machinery. These synchronized pulses can vary by the delay angle, pulse width, number of pulses per period, number of skipped pulses, and total number of pulses. Due to the design of the pulse generator in certain embodiments, any and all of these parameters can be changed independently, yielding an unparalleled level of versatility.

It should be appreciated that there may be two user interfaces to the pulse generator in some embodiments. The first may be a LabView™ program that has the advantage of displaying all of the pulse parameters and input signal data within a single organized window on a display of a computing system. Furthermore, the LabView™ interface may plot the rotations per minute (RPMs) of the two input signal channels in real time.

Figure 1:
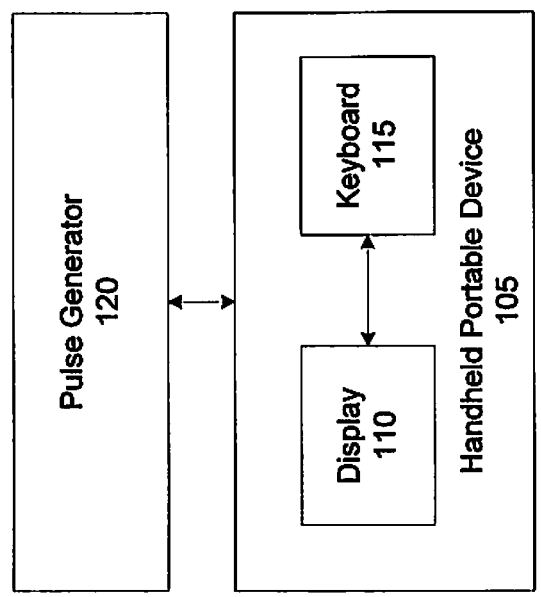
FIG. 1 is a block diagram illustrating a pulse generator system, according to an embodiment of the present invention.

The second user interface is a handheld portable device 105 shown in FIG. 1 that can be placed anywhere a computer is not accessible. Handheld portable device 105 may include a liquid-crystal display 110 and keypad 115 to enable the user to control a pulse generator 120 by scrolling through a host of command menus and parameter listings. Pulse generator 120 may connect to rotating machinery (not shown) through one or more sensor inputs (also not shown). It should be appreciated that the one or more sensors (not shown) may connect to the one or more sensor inputs. In certain embodiments, each sensor may be dedicated to a predefined location on the rotating equipment of the engine. For example, each sensor may be located every 60 degrees, every 120 degrees, etc.

Depending on the configuration of the one or more sensors, pulse generator 120 may generate a plurality of pulses such that the period between the pulses can be calculated. In one embodiment, based on data that is inputted via keypad 115, pulse generator 120 may output via display 110 a once-per-revolution signal to identify the location of a particular engine blade. Inputted data may include sensor specification such as degrees per pulse, pulse width, skipped pulses, number of skipped pulses, multiple pulses, and the number of multiple pulses. Based on the data that is inputted, outputted data may include a period between pulses or the RPMs.

Figure 2:
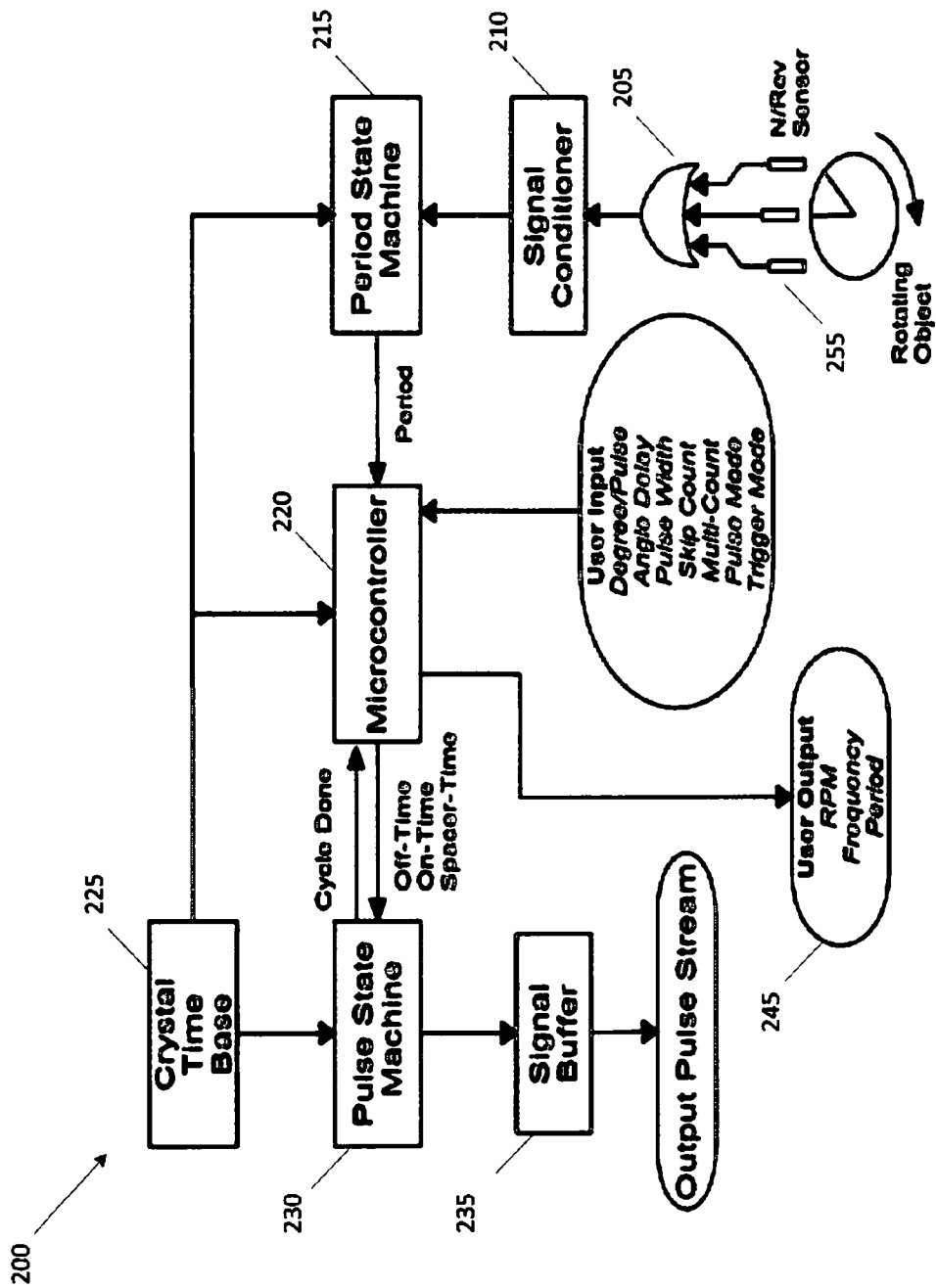
FIG. 2 is a block diagram illustrating a pulse generating state machine, according to an embodiment of the present invention.

FIG. 2 is a block diagram 200 illustrating a pulse generating state machine, according to an embodiment of the present invention. Conventional pulse generators alter the frequency to match a desired number of pulses in between the revolutions. However, in this embodiment, a crystal time base is maintained, a first counter is utilized to determine when to begin generating the pulses, and a second counter is utilized to determine when to turn off the pulses once the pulses have begun to generate.

The conventional method of synchronizing the signal input frequency with a voltage-controlled oscillator (VCO) and outputting a multiple of that frequency corresponding to the number of blades, gear teeth, etc., involves many more components. Generally, there is a phased-locked loop configuration with a phase detector, loop filter, voltage-controlled oscillator and digital logic for the divide-by-n counter and count-to-blade counter. Each of these individual components is also a source of error. Most notably, the VCO tends to drift with time and temperature more so than a crystal time base as used in the PDG. Thus, a crystal time base, as used in this embodiment, is more efficient over the conventional system.

In FIG. 2, plurality of sensors (N/Rev Sensors) 255 are shown. Each sensor 255 is located proximate to a rotating object (e.g., blades of an engine). Each sensor 255 is connected to an input unit 205 of the pulse generating machine.

For example, for each rotation of a blade, a pulse or a signal is generated by each sensor 255 and is transmitted to a signal conditioner 210. Signal conditioner 210 is configured to condition the generated signal, which is then transmitted to a period state machine 215. The signal conditioner 210 allows for a wide range of signal input as well as protection from voltage spikes which are often present in noisy test cell environments. Although the logic thresholds adhere to TTL levels, the signal conditioner 210 can withstand a steady 80 volt amplitude signal referenced from ground. Using the time from crystal time base 225, period state machine 215 is configured to determine the time duration (or period) between the generated pulses or signals such that the rotational speed of the blade can be realized, and transmit the period to microcontroller 220.

In addition to receiving the period from period state machine 215, microcontroller 220 may receive user input, such as degree/pulse, angle delay, pulse width, skip count, multi-count, pulse mode, trigger mode, etc., from an input device (not shown). Based on the information received from period state machine 215 and the user input, microcontroller 220 may transmit the appropriate counts (e.g., off-time count and on-time count) to pulse state machine 230. It should be noted that in certain embodiments, microcontroller 220 may transmit a delay counter, duration of the pulse, a mode to skip a number of pulses, a mode to have a pulse for every blade or every other blade, etc.

It should be appreciated that in order to produce multiple pulses with a user specified width from a once-per-rev signal, as in the case for simulating the multiple blade output, a spacer time is inserted after each pulse (on-time) to pad the signal period. In some embodiments, the sum of the on-time plus the spacer-time should fit a user specified integer number of times within the once-per-rev signal period. The off-time may establish the delay off the once-per-blade generated signal. As an illustration, assume there were 100 blades and the PDG was setup to produce 10 pulses (one for every $10^{th}$ blade) off the once-per-rev signal. The $1^{st}$ blade, $11^{th}$ blade, $21^{st}$ blade, etc., will each have a pulse produced with the desired width. Adjusting the off-time could allow for the $2^{nd}$ blade, $12^{th}$ blade, $22^{nd}$ blade, etc., to produce pulses or the $3^{rd}$ blade, $13^{th}$ blade, $23^{rd}$ blade, etc., to produce pulses. This delay would work all the way to the $9^{th}$ blade, $19^{th}$ blade, $29^{th}$ blade, etc., after which it's equivalent to starting from the $1^{st}$ blade, $11^{th}$ blade, $21^{st}$ blade, etc., again.

Using the information received from microcontroller 220 and crystal time base 225, pulse state machine 230 may control the time duration to the start of the pulse and the time duration of the pulse. A signal buffer 235 is used in this embodiment to provide a buffer to boost the generated pulse and to protect the components in the pulse generating state machine.

Once the cycle is complete, pulse state machine 230 transmits a cycle done signal to microcontroller 220. Once the cycle is complete and based on the information received from period state machine 215, microcontroller 220 may calculate and output the RPMs, frequency, and period to user output 245, e.g., a handheld device or another computing device (not shown).

Figure 3:
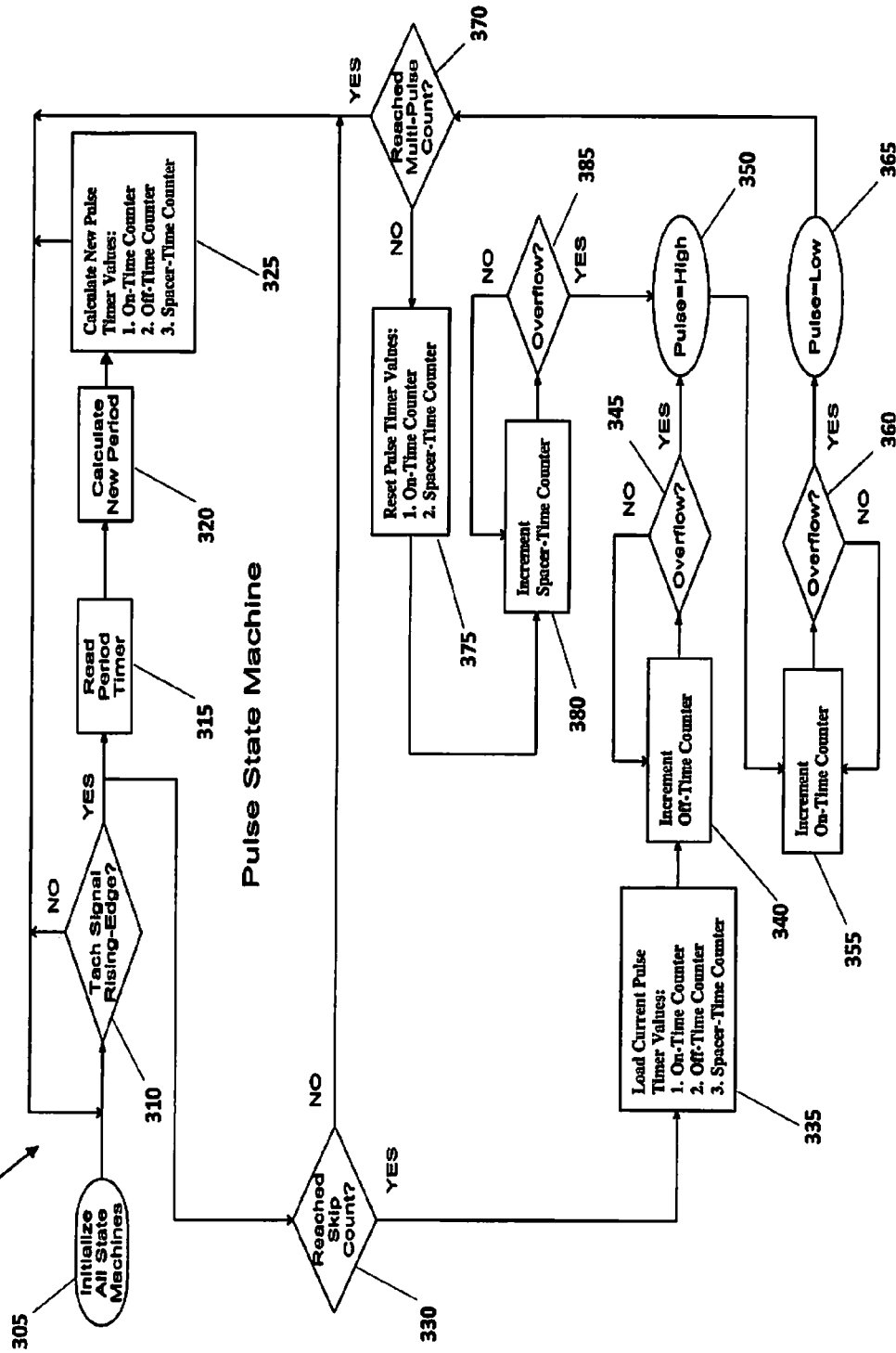
FIG. 3 is a flow diagram illustrating a process for generating a pulse, according to an embodiment of the present invention.

FIG. 3 is a flow diagram 300 illustrating a process for generating a pulse, according to an embodiment of the present invention. The process of FIG. 3 may be executed by the pulse generating state machine of FIG. 1 or 2. In this embodiment, the process begins at 305 with the pulse generating state machine initializing all state machines, e.g., period state machine and pulse state machine. At 310, the period state machine may determine whether the tachometer signal is a rising-edge. If there is no rising edge tachometer signal, the period state machine waits until the tachometer signal is a rising-edge tachometer signal.

If the tachometer signal is a rising-edge tachometer signal at 310, the period state machine reads a period timer value at 315, and calculates a value for a new period at 320. The value for the new period may be the difference between the previous value of the period timer and the current value of the period timer. The timer is free running at the 10 MHz clock frequency. At each rising edge of the input signal, the current value of the timer is latched. To determine the period between rising edges of the clock signal, the difference between any two consecutive timer values is calculated. At 325, using the value of the new period, the period state machine may calculate a new pulse on-time, a new pulse off-time and spacer time values (if in the multi-pulse mode), etc.

It should be appreciated that once the input signal period is known along with other physical factors, such as the number of blades and the number of sensors, within the rotating object, values, such as the time spacing between blades (period/number of blades), can be calculated. Also, the delay time to a specified blade or angle or rotation may be determined by multiplying the desired blade number by the time spacing between blades (delay time=blade N×{period/number of blades}).

Furthermore, upon the rising-edge of the tachometer signal, the pulse state machine determines whether a skip count is reached at 330. It should be appreciated that the user of the pulse generating state machine may set the skip count in order to generate the pulse after the desire number of pulses have be counted. If the skip count is not reached (e.g., if the count is 0), the pulse state machine returns to 310 to determine whether the tachometer signal is a rising-edge tachometer signal.

If pulse state machine determines that the skip count is reached (e.g., if the count is 1), the information, such as current pulse off-time and on-time values, spacer time values, etc., are loaded at 335. It should be appreciated that such information may be received from the user input and the period state machine. For example, the user input may indicate when the pulse should occur, at which blade the pulse should occur at, how many revolutions should be skipped before the pulse occurs, etc.

At 340, the pulse state machine may increment a value of the pulse off-time, and, at 345, determine whether the value of the pulse off-time is equal to or greater than an overflow value. Stated differently, the pulse state machine determines whether the overflow value has been reached. In certain embodiments, the overflow value may be a predefined value set by the user. All of the time values and counter values (e.g., skip count, multi-pulse count, etc.) are loaded into 32-bit or 16-bit synchronous counters which upon overflow (transitioning from maximum value to 0) indicate that the user specified timer or counter values have been reached.

If the overflow value has not been reached, the value of the pulse off-time is increased at 340. Stated differently, the pulse is not generated. When the overflow value has been reached, the pulse state machine switches the pulse to high at 350, i.e., starts to generate a pulse.

While the pulse is generated, the pulse state machine increments a value for the pulse on-time at 355. At 360, the pulse state machine determines whether the value for the pulse on-time is equal to or greater than an overflow value, e.g., determines whether the overflow value has been reached for the pulse on-time value. If the overflow value has not been reached, the pulse on-time value is incremented.

When the overflow value is reached, the pulse state machine switches the pulse to low at 365, i.e., turns off the pulse. At 370, the pulse state machine determines whether multi-pulse count has been reached. It should be appreciated that the multi-pulse count may be a predefined value set by the user of the pulse generating state machine. When the multi-pulse count is reached (e.g., count equals to 1), the process returns to 310 to determine whether the tachometer signal is a rising-edge tachometer signal.

However, when the multi-pulse count is not reached (e.g., count is 0), the pulse state machine resets values for pulse spacer and on-time at 375. At 380, the pulse state machine increments a pulse spacer-time value and, at 385, the pulse state machine determines whether the pulse spacer-time value is equal to the overflow value (e.g., has the overflow been reached). If the overflow value has not been reached, then the pulse state machine returns to 375 to increment the pulse-spacer time value. When the overflow value is reached, the pulse state machine switches the pulse to high at 350, and the pulse state machine continues through steps 355-370 in a manner similar to that discussed above.

The method steps shown in FIG. 3 may be performed, in part, by a computer program, encoding instructions for a nonlinear adaptive processor to cause at least the methods described in FIG. 3 to be performed by the apparatuses discussed herein. The computer program may be embodied on a non-transitory computer readable medium. The computer readable medium may be, but is not limited to, a hard disk drive, a flash device, a random access memory, a tape, or any other such medium used to store data. The computer program may include encoded instructions for controlling the nonlinear adaptive processor to implement the method described in FIG. 3, which may also be stored on the computer readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

Figure 4:
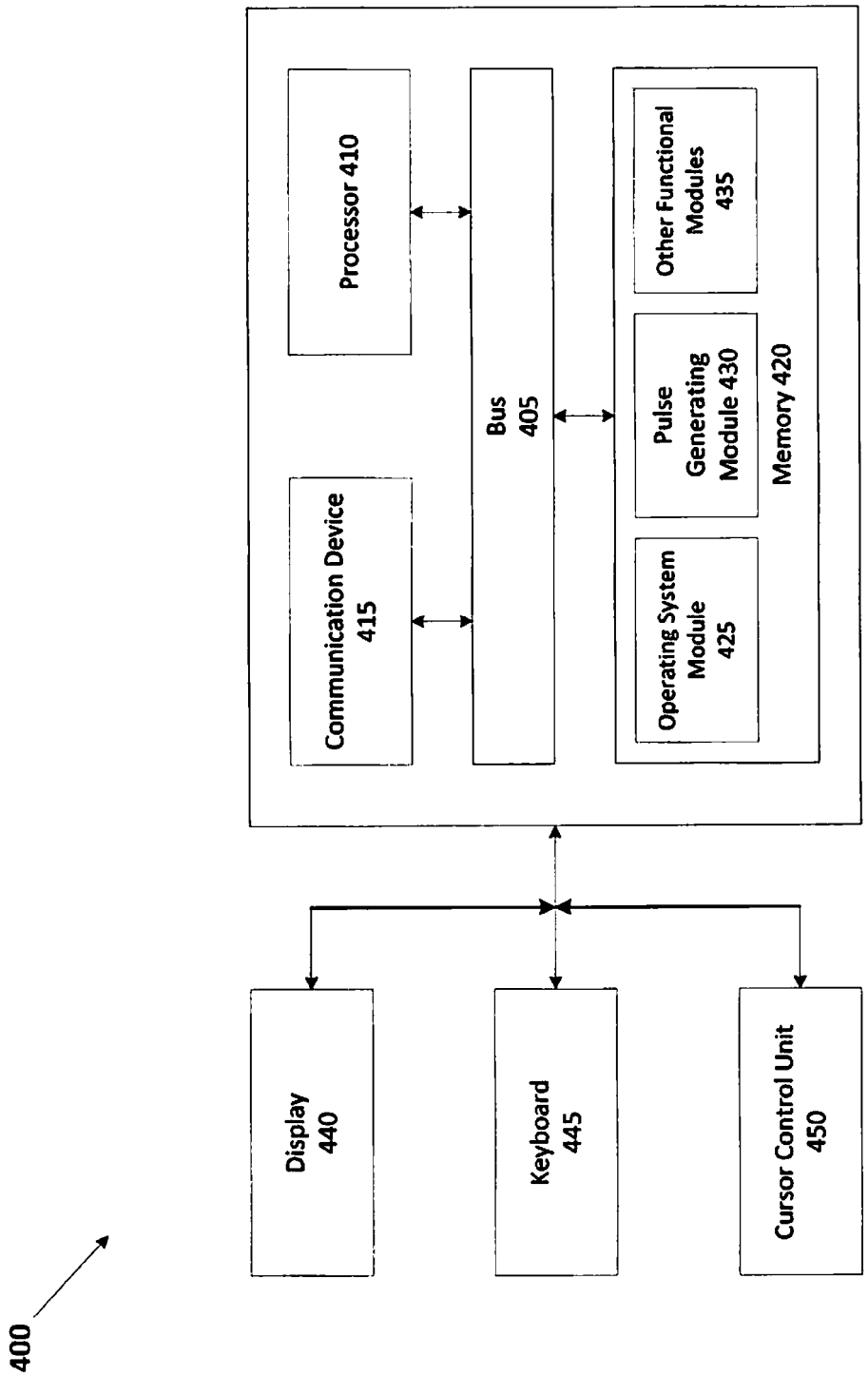
FIG. 4 is a block diagram of a computing system, according to an embodiment of the present invention.

FIG. 4 is a block diagram 400 of a computing system, according to an embodiment of the present invention. System 400 may include a bus 405 or other communication mechanism that can communicate information and a processor 410, coupled to bus 405, that can process information.

Processor 410 can be any type of general or specific purpose processor. System 400 may also include memory 420 that can store information and instructions to be executed by processor 410. Memory 420 can be comprised of any combination of random access memory ("RAM"), read only memory ("ROM"), static storage such as a magnetic or optical disk, or any other type of computer readable medium. System 400 may also include a communication device 415, such as a network interface card, that may provide access to a network.

The computer readable medium may be any available media that can be accessed by processor 410. The computer readable medium may include both volatile and nonvolatile medium, removable and non-removable media, and communication media. The communication media may include computer readable instructions, data structures, program modules, or other data and may include any information delivery media.

Processor 410 can also be coupled via bus 405 to a display 440, such as a Liquid Crystal Display ("LCD"). Display 440 may display information to the user, such as RPM, frequency, and the period. A keyboard 445 and a cursor control unit 450, such as a computer mouse, may also be coupled to bus 405 to enable the user to interface with system 400.

According to one embodiment, memory 420 may store software modules that may provide functionality when executed by processor 410. The modules can include an operating system 425 and a pulse generating module 430, as well as other functional modules 435. Operating system 425 may provide operating system functionality for system 400. Because system 400 may be part of a larger system, system 400 may include one or more additional functional modules 435 to include the additional functionality, e.g., period generating module.

One skilled in the art will appreciate that a "system" could be embodied as a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

One or more embodiments of the present invention pertain to an adaptive phase delay generator to allow a user to generate pulses synchronized to the rising edge of a tachometer signal from any piece of rotating machinery. The adaptive phase delay generator allows the user to adjust the delay, the pulse width, the pulse count, the number of skipped pulses, and produce a specified number of pulses per revolution. Each parameter can be changed independently providing an unparalleled level of versatility when synchronizing hardware to a host of rotating machinery. The adaptive phase delay generator may allow a user to setup quickly and generate a host of synchronizing configurations using a simple user interface that may lead to faster results.

It will be readily understood that the components of the invention, as generally described and illustrated in the figures herein, may be arranged and designed in a wide variety of different configurations. Thus, the detailed description of the embodiments is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
 a crystal time base for accurately measuring time;
 three or more counters for determining an on-time value, an off-time value, and a spacer-time value;

a pulse state machine synchronized to the crystal time base and utilizing the on-time value, the off-time value, and the spacer-time value to receive a plurality of electrical input pulses from one or more external sources so as to generate a plurality of electrical output pulses synchronized to said electrical input pulses; and a period state machine configured to determine a period for each of the plurality of electrical input pulses;

wherein the pulse state machine is configured to correlate the electrical output pulses to the electrical input pulses, and wherein the pulse state machine varies the electrical output pulses relative to the electrical input pulses based on a delay angle, a pulse width, a number of electrical output pulses per electrical input pulse, a number of skipped electrical input pulses, or a total number of allowed electrical output pulses.

2. The apparatus of claim 1, wherein the three or more counters includes a first counter configured to determine when to begin generating the plurality of electrical output pulses.

3. The apparatus of claim 2, wherein the three or more counters includes a second counter configured to determine when to turn off the plurality of electrical output pulses.

4. The apparatus of claim 1, further comprising:
a microcontroller configured to receive the period from the period state machine for each of the plurality of electrical input pulses, and receive input information from a computing system.

5. The apparatus of claim 4, wherein the input information comprises at least one of a degree of a pulse, an angle delay of the pulse, a width of the pulse, a skip count, a multi-count, a mode of the pulse, and a mode of trigger.

6. The apparatus of claim 4, wherein the microcontroller is further configured to output information to a display of the computing system, and
the output information comprises at least one of revolutions per minute of a rotating object, a frequency of the plurality of pulses, and the period for each of the plurality of pulses.

7. The apparatus of claim 1, wherein the plurality of electrical output pulses are generated using a fixed crystal time base.

8. A process, comprising:
measuring time using a crystal time base;
determining an on-time value, an off-time value, and a spacer-time value using three or more counters;
generating, by a pulse state machine synchronized to the crystal time base and utilizing the on-time value, the off-time value, and the spacer-time value to receive a plurality of electrical input pulses from one or more external sources so as to generate a plurality of electrical output pulses synchronized to said electrical input pulses, a plurality of electrical output pulses for a rotating object; and
determining, by a period state machine, a period for each of the plurality of electrical input pulses for the rotating object;
wherein the electrical output pulses are correlated to the electrical input pulses, and wherein the pulse state machine varies the electrical output pulses based on a delay angle, a pulse width, a number of electrical output pulses per electrical input pulse, a number of skipped electrical input pulses, or a total number of allowed electrical output pulses.

9. The process of claim 8, wherein a first counter is utilized to determine when to begin generating the plurality of electrical output pulses.

10. The process of claim 8, wherein a second counter is utilized to determine when to turn off the plurality of electrical output pulses.

11. The process of claim 8, further comprising:
receiving, at a microcontroller, the period for each of the plurality of electrical input pulses from the period state machine; and
receiving input information from a computing system.

12. The process of claim 11, wherein the input information comprises at least one of a degree of a pulse, an angle delay of the pulse, a width of the pulse, a skip count, a multi-count, a mode of the pulse, and a mode of trigger.

13. The process of claim 11, further comprising:
generating, by the microcontroller, output information comprising at least one of revolutions per minute of a rotating object, a frequency of the plurality of electrical input pulses, and the period for each of the plurality of electrical input pulses.

14. The process of claim 8, wherein the plurality of electrical output pulses are generated using a fixed crystal time base.

15. An apparatus, comprising:
a crystal time base for accurately measuring time;
three or more counters for determining an on-time value, an off-time value, and a spacer-time value;
a microcontroller configured to transmit an off-time counter and an on-time counter to a pulse state machine, said pulse state machine synchronized to the crystal time base and utilizing the on-time value, the off-time value, and the spacer-time value to receive a plurality of electrical input pulses from one or more external sources so as to generate a plurality of electrical output pulses synchronized to said electrical input pulses, wherein
the off-time counter is configured to determine when to generate a electrical output pulse for a rotating object, and
the on-time counter is configured to determine when to turn off the electrical output pulse for a rotating object;
wherein the pulse state machine is configured to correlate the electrical output pulses to the electrical input pulses, and wherein the pulse state machine varies the electrical output pulses relative to the electrical input pulses based on a delay angle, a pulse width, a number of electrical output pulses per electrical input pulse, a number of skipped electrical input pulses, or a total number of allowed electrical output pulses.

16. The apparatus of claim 15, wherein the pulse state machine is configured to generate the electrical output pulse using the off-time counter.

17. The apparatus of claim 16, wherein the electrical output pulse is generated using a fixed crystal time base.

18. The apparatus of claim 16, wherein the generated electrical output pulse is synchronized to a rising edge of a tachometer signal received from the rotating object.

19. The apparatus of claim 15, further comprising:
a period state machine configured to determine a period for the generated electrical output pulse.

20. The apparatus of claim 15, wherein the microcontroller is configured to determine the revolutions per minute of the rotating object, a frequency of the pulse, and a period of the pulse.

* * * * *